US009652914B2

(12) United States Patent
Rosener

(10) Patent No.: US 9,652,914 B2
(45) Date of Patent: May 16, 2017

(54) METHODS AND SYSTEMS FOR SECURE PASS-SET ENTRY

(75) Inventor: Douglas Rosener, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1258 days.

(21) Appl. No.: 12/872,915

(22) Filed: Aug. 31, 2010

(65) Prior Publication Data

US 2012/0050008 A1 Mar. 1, 2012

(51) Int. Cl.

| | |
|---|---|
| ***G06F 7/04*** | (2006.01) |
| ***G07C 9/00*** | (2006.01) |
| *H04R 1/10* | (2006.01) |

(52) U.S. Cl.

CPC ........ *G07C 9/00142* (2013.01); *H04R 1/1041* (2013.01)

(58) Field of Classification Search

CPC .. H04R 5/033; H04R 1/1041; H04R 2420/07; H04R 5/04; H04R 1/1016; G07C 9/00896; G07C 9/00142; G07C 5/008; G07C 9/00309; G07C 9/00666; G07C 9/00912; G07C 9/00698; B60R 25/24; E05B 37/00; E05B 5/003

USPC ............ 340/4.1, 4.14, 5.51, 5.54, 5.81, 5.85

See application file for complete search history.

(56) References Cited

U.S. PATENT DOCUMENTS

| | | | | |
|---|---|---|---|---|
| 5,737,393 | A | 4/1998 | Wolf | |
| 6,115,513 | A | 9/2000 | Miyazaki et al. | |
| 6,496,182 | B1 * | 12/2002 | Wong et al. | 345/173 |
| 6,527,171 | B1 | 3/2003 | Brooks et al. | |
| 6,549,194 | B1 | 4/2003 | McIntyre et al. | |
| 6,630,928 | B1 | 10/2003 | McIntyre et al. | |
| 6,828,918 | B2 * | 12/2004 | Bowman et al. | 340/4.1 |
| 7,188,314 | B2 | 3/2007 | Mizrah | |
| 2004/0037016 | A1 | 2/2004 | Kaneko et al. | |
| 2004/0225880 | A1 | 11/2004 | Mizrah | |
| 2005/0044425 | A1 | 2/2005 | Hypponen | |
| 2005/0134578 | A1 * | 6/2005 | Chambers et al. | 345/184 |
| 2007/0266428 | A1 * | 11/2007 | Downes et al. | 726/5 |
| 2008/0052245 | A1 | 2/2008 | Love | |
| 2008/0098464 | A1 | 4/2008 | Mizrah | |
| 2011/0078630 | A1 * | 3/2011 | Duquene et al. | 715/823 |
| 2011/0295740 | A1 * | 12/2011 | Blackwell | 705/39 |
| 2012/0050008 | A1 | 3/2012 | Rosener | |

* cited by examiner

*Primary Examiner* — Omer S Khan

(74) *Attorney, Agent, or Firm* — Chuang Intellectual Property Law

(57) ABSTRACT

Methods and systems for secure pass-set entry are disclosed. In one example, an authenticator device is configured to generate a pass-set menu to output in visual format on the display. An I/O device is configured to output audio corresponding to the pass-set menu to the user. A user input interface is configured to receive user actions to navigate the pass-set menu and receive user menu selections.

15 Claims, 17 Drawing Sheets

27

224 226

| index | item data |
|---|---|
| 0 | none |
| 1 | red |
| 2 | light |
| 3 | green |
| 4 | clean |
| .. | |
| 18 | big |

FIGURE 2G

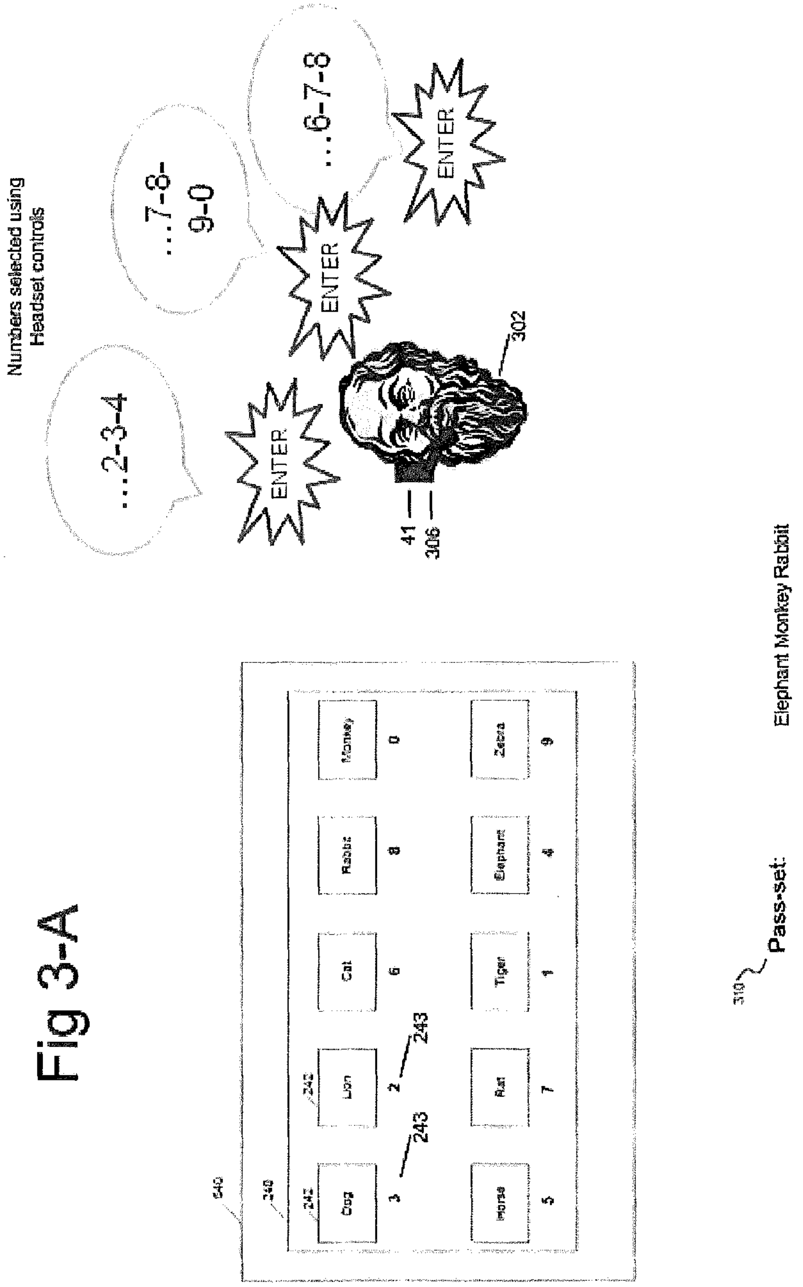
Fig 3-A

Fig 3-B
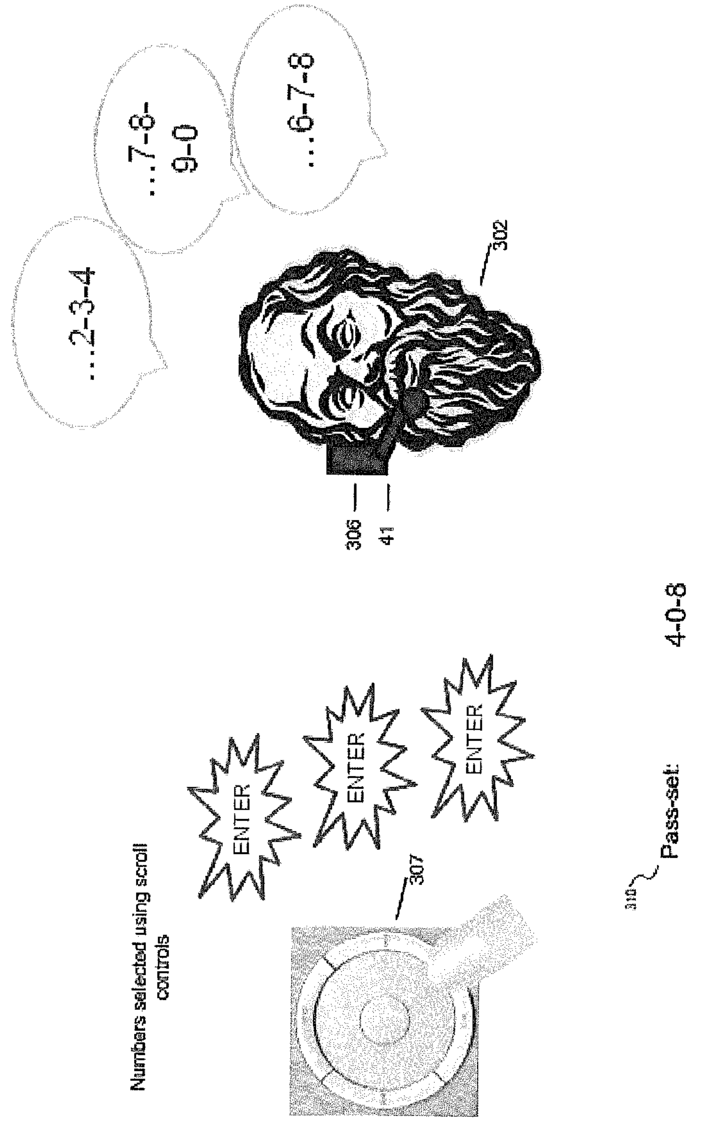

METHODS AND SYSTEMS FOR SECURE PASS-SET ENTRY

BACKGROUND OF THE INVENTION

A pass-set is a form of secret authentication data that is used to control access to a resource, thereby providing security. Each time a user wishes to use the resource the user is asked to enter the pass-set. If the entered pass-set is valid, the user is permitted to access the resource, otherwise access is denied.

Pass-set entry requirements are used in a variety of applications. For example, a typical computer user if required to enter pass-sets for a wide variety of purposes, such as logging in to a computer account, retrieving e-mail from servers, accessing certain files, databases, networks, web sites, etc. In banking applications, a bank account holder is required to enter a personal identification number (PIN), in order to access an automated teller machine (ATM) to conduct a banking transaction.

Pass-sets generally contain a string of data including numerical digits, upper/lower case alphabetical characters, and other typeable symbols. Preferably, from a security perspective, the string of data for any given pass-set contains as random a sequence of digits, characters and symbols as possible. While random like sequences are more secure, they are often difficult for users to remember, and users often change the pass-set to something that is easier to remember, for example, the name or other descriptive characteristic of a family member (e.g., a birth date). Unfortunate consequences of simplifying the pass-set, however, are that the pass-set becomes more susceptible to being cracked by a hacker, and the security of the resource becomes compromised.

A pass-set should be kept secret by those who are entitled to access the resource so that secure access of the resource can be maintained. This is easy while users are not accessing the resource. However, the users must reveal the pass-set, to some degree, when requesting access to a resource. While revealing the pass-set may only be for a brief moment in time, it does, nevertheless, render the pass-set vulnerable to being stolen. One of the typical methods to enter the pass-set before accessing the resource is to type in the pass-set from a device such as a keyboard, a number pad, push buttons on a telephone, or the like. Another method is to enter the pass-set verbally into a system that recognizes human voices. A problem with both of these approaches is that an eavesdropper may steal the pass-set by watching or listening to the pass-set being entered. The stolen password then allows the resource to be accessed illegitimately. These problems are compounded by the availability of state-of-the-art keystroke recording and voice recording virus software on computers, since they provide perpetrators the means to pick up the pass-set even if a user is very careful when entering the pass-set. For example, typing in with a shield covering the keyboard or speaking with a low voice would not be a defense against such virus software.

As a result, systems and methods are needed that allow users to securely enter pass-sets for accessing resources without the risk of revealing the pass-sets to others.

BRIEF DESCRIPTION OF THE DRAWINGS

The present invention will be readily understood by the following detailed description in conjunction with the accompanying drawings, wherein like reference numerals designate like structural elements.

FIG. 2G is a table showing an exemplary lookup table or map for converting indirectly referenced item data to a directly referenced item data.

FIGS. 3A-3B are diagrams showing two exemplary methods by which a user selects an item from a pass-set entry menu, according to embodiments of the present invention.

DESCRIPTION OF SPECIFIC EMBODIMENTS

Figure 1A:
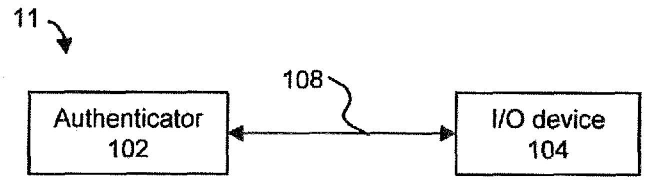
FIG. 1A is a diagram of an exemplary system for secure pass-set entry for a user of an I/O device and an authenticator over a wired link, according to an embodiment of the present invention.

Methods and apparatuses for pass-set entry are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The present invention generally relates to authentication of users for access to resources protected by passwords (i.e., more generally pass-sets), and more particularly to systems and methods for securely entering pass-sets. In one example, an exemplary authenticator device includes an authentication application, an output interface and a user-controls interface. The authentication application is configured to generate aural, visual, audiovisual or tactile messages containing one or more pass-set entry menus, in response to a request to access a pass-set-protected resource by a user of the I/O device. Each of the one or more pass-set entry menus includes one or more items. In one example, the order of the items may be randomized when generated. In a further example, the order of the items is fixed and the start point of the item presented to the user is randomized.

In one example, one output interface at the authenticator device is a display configured to present a generated visual menu for the user to view. The generated visual menu may be a matrix of items, or alternatively, a series of pass-set entry menus. In conjunction with the visual matrix displayed at the authenticator device, the authenticator device transmits audio corresponding to the visual matrix choices to the I/O device for private output to the I/O device user. One exemplary I/O device output interface is a headphone of a headset, in which only a wearer of the headset can hear presented pass-sent entry menu items. In one example, a user-controls interface is configured at the I/O device to assist the user in making a selection from the matrix, or alternatively, each of the one or more pass-set entry menus. Then selections from the user-controls interface are then assembled into a user entered pass-set for authenticating the user's identity by authenticators that control pass-set-protected resources. Since audio messages representing pass-set entry menus displayed on the authenticator device are securely presented to the user via the I/O device headphone, and the user can make selections from the menus by the item number without revealing the matrix selection being made, the problems and shortcomings of prior art approaches are overcome.

In one implementation, the user is presented visually with all the menu choices on their handset or PC with an associated identifier. For example, the identifier may be a letter, number, or combination thereof. Optionally each menu item is put in a random order or has a randomized index number beside it. The user keys in the choices on a headset by scrolling through an audio list of numbers/letters, with a random starting place after each selection, and scrolls and selects the menu items when the identifier is reached. After each selection, the start point is randomized.

In another method, the user uses one or more scroll bars on their handset or PC to traverse through a matrix menu of audio choices, again resetting after each selection and randomizing the start. For example, if the password is {HORSE, HORSE, TIGER, TIGER}, the user scrolls horizontally on a vertical scroll bar on their handset or hearing "insect, animals, vegetables" and stops at the "animals" line. Then using a vertical scroll bar, the user traverses until they hear "HORSE" and hits the select button. This is repeated with the choices on the vertical and horizontal bars randomized. An observer has no idea what was selected as they cannot hear the menu choices.

Advantageously, these methods are easier for users to navigate as complicated menu traversal on a headset is simplified to a linear choice. In one method, headset controls are not even used. Users are much more comfortable making traversals on a handset, or using a mouse and keyboard on a PC typically with an associated control displayed on the screen.

In one example, a system for secure pass-set entry includes an authenticator device including a processor, a display, and a memory storing an authentication application configured to generate a pass-set menu to output in visual format on the display. The system includes a headset device including an output interface configured to securely output audio to a user, the audio including a plurality of identifiers corresponding to the pass-set menu. The headset device further includes a user input interface configured to receive user actions to navigate the plurality of identifiers and receive user selections, and a data interface for transmitting user selections to the authenticator device.

In one example, a system for secure pass-set entry includes an authenticator device and a headset device. The authenticator device includes a processor, a display, and a memory storing an authentication application configured to generate a pass-set menu to output in visual format on the display. The authentication application is further configured to output audio corresponding to the pass-set menu. The headset device is configured to receive the audio corresponding to the pass-set menu from the authenticator device. The headset device includes an output interface configured to securely output audio corresponding to the pass-set menu to the user, a user input interface configured to receive user actions to navigate the pass-set menu and receive user menu selections, and a data interface for receiving audio corresponding to the pass-set menu from the authentication device and transmitting user menu selections to the authenticator device.

In one example, a method for secure pass-set entry includes generating a pass-set menu at an authenticator device, outputting the pass-set menu in a visual format on an authenticator device display, and securely outputting an audio associated with the pass-set menu at a headset device. The method further includes receiving user actions at the headset device to navigate the pass-set menu and receive user menu selections, where the user actions are responsive to the pass-set menu in the visual format in conjunction with the audio securely output at the headset device. The user actions are transmitted from the headset device to the authenticator device. In one example, the method further includes assembling the user actions into a user-entered pass-set.

In one example, a system for secure pass-set entry includes an authenticator device and a headset device. The authenticator device includes a processor and a memory storing an authentication application configured to generate a pass-set menu and configured to transmit audio corresponding to the pass-set menu to a device remote from the authenticator device. The authenticator device also includes a user interface configured to receive user actions to navigate the pass-set menu and receive user menu selections, where responsive to the user actions audio corresponding to a new menu position or a new menu is transmitted to the device remote from the authenticator device. The headset device is configured to receive the audio corresponding to the pass-set menu from the authenticator device. The headset device includes a user output interface configured to securely output audio corresponding to the pass-set menu to the user.

In one example, a method for secure pass-set entry includes generating a pass-set menu at an authenticator device and securely outputting an audio associated with the pass-set menu at a headset device. User actions are received at the authenticator device to navigate the pass-set menu and receive user menu selections, where the user actions at the authenticator device are responsive to the audio securely output at the headset device. The method further includes responsively transmitting audio to the headset device from the authenticator device.

In one example, a method for secure pass-set entry includes generating a pass-set menu having a fixed order of items, randomizing a start point of menu item output, and securely outputting an audio associated with the pass-set menu corresponding to a next menu item at a headset device. User actions are received corresponding to a next item command, a previous item command, or an item selection command, the user actions responsive to the audio securely output at the headset device. User actions are tracked corresponding to the next item command and the previous item commands. The method further includes deter mining a selected item using the start point and the tracked user actions corresponding to the next item command and the previous item commands.

In one example, a method for secure pass-set entry includes generating a pass-set menu at headset device, transmitting the pass-set menu to an authenticator device, outputting the pass-set menu in a visual format on an authenticator device display, and securely outputting an audio associated with the pass-set menu at the headset device. The method further includes receiving user actions at the headset device to navigate the pass-set menu and receive user menu selections, the user actions responsive to the pass-set menu in the visual format in conjunction with the audio securely output at the headset device. The user actions are transmitted from the headset device to the authenticator device.

Referring first to FIG. 1A, there is shown a secure pass-set entry system 11, according to an embodiment of the present invention. The secure pass-set entry system 11 comprises an authenticator 102 and an input/output (I/O) device 104. The authenticator 102 is configured to authenticate a user, when the user requests an access to resources under the authenticator's control. The I/O device 104 is configured to provide a secure environment for the user to enter a pass-set for the authentication. The authenticator 102 may comprise, for example, a computing device, cellular phone, a personal digital assistant (PDA), physical access points like a door or turnstile, etc. The I/O device 104 may comprise a headset, a personal heads-up display (HUD) device, some form or combination of a headset and HUD, a haptic device, or any suitable device for presenting and receiving pass-set entry related information.

Figure 1B:
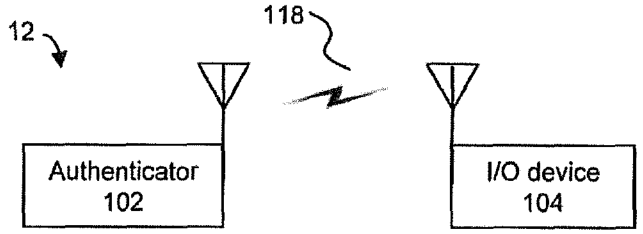
FIG. 1B is a diagram of an exemplary system for secure pass-set entry for a user of an I/O device and an authenticator over a wireless link, according to an embodiment of the present invention.

According to one embodiment, data communication between the I/O device 104 and the authenticator 102 is transmitted via a wired link 108 (e.g., a Universal Serial Bus (USB)) as shown in FIG. 1A. According to another embodiment, shown in FIG. 1B, the data communication is transmitted via a wireless link 118, for example, a Bluetooth wireless link, a Wi-Fi (IEEE 802.11) wireless link, a Wi-Max (IEEE 802.16) link, a cellular communications wireless link, or other wireless communications link, etc.

In the systems 11 and 12, an authentication application is installed on either or both of the authenticator 102 and the I/O device 104. While the term "headset" has various definitions and connotations, for the purposes of this disclosure, the term is meant to refer to either a single headphone (e.g., a monaural headset) or a pair of headphones (e.g., a binaural headset capable of outputting audio in a private manner directly into the user ear), which include(s) or does not include, depending on the application and/or user-preference, a microphone that enables voice recognition.

Figure 2A:
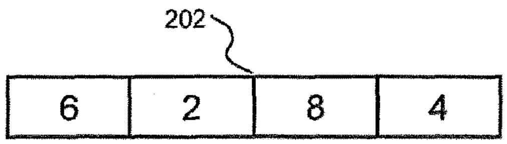
FIGS. 2A-2C are diagrams showing various exemplary pass-sets.
Figure 2B:
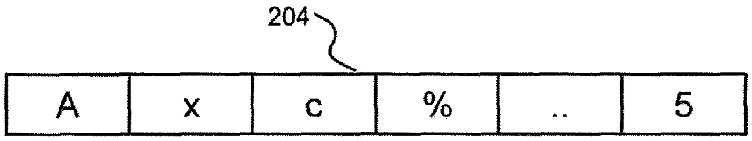

Referring now to FIGS. 2A-2H, for the purposes of clarifying this disclosure, the terms "pass-set", 'position", "element", "item data", "item number", "item order", "directly referenced item data', "indirectly referenced item data", and "pass-set entry menu" are defined and described. A pass-set is defined as comprising one or more positions of elements. When each of the positions contains only numerical digits (i.e., 0-9) as shown in FIG. 2A, the pass-set is often referred to as a PIN 202 such as those used for accessing an ATM in a banking transaction. More commonly on personal computers and Internet access, a pass-set may contain a data string 204 as shown in FIG. 2B, each of the positions of the pass-set is a character including alphabets, numbers and/or special symbols. The pass-set 204 has in general N (N is a positive integer greater or equal to 1) positions. In the exemplary pass-set 204 shown, position 1 contains element 'A', position 2 element 'x', and so on. This type of pass set is usually referred to as a "password".

Figure 2C:
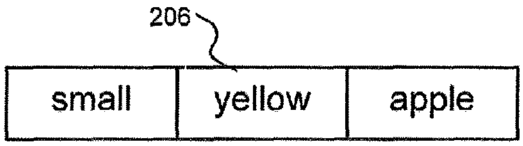

In a more complex form, elements of a pass-set may include words instead of characters. For example, there are three positions with respective elements: "small", "yellow", and "apple" in an exemplary pass-set 206 as shown in FIG. 2C. To expand from this concept, the elements of a pass-set may comprise objects other than words. For example, the elements may include music notes, music snippets, pictures, video snippets, etc. Pass-sets of these types allow a user or person to memorize much easier than an arbitrary data string used in prior art approaches.

According to one example, the authentication application allows a user of the I/O device to enter pass-set securely by generating one or more pass-set entry menus. Each of the menus includes at least one item for the user to make a selection. In one example, the order of the items in each menu can be randomized when generated to improve security. In a further example, the order of the items in each menu remains fixed, but the start point within the menu in presenting the menu items to the user is randomized. The user selection (e.g., item number of the selected item) is then assembled to form a user entered pass-set. In one example, a single menu is generated consisting of a menu matrix of all the possible choices and presented visually to the user.

In one implementation, menu or menus are presented to the user in visual format on a display at the authenticator device. As the user manipulates a control on the I/O device, choices corresponding to the menus are securely presented to the user via audio messages in the I/O device, so that the menu choices being presented and selected cannot be overheard or seen by others. In one example, the user navigates the menus or matrix and makes selections with the user controls interface at the I/O device. In this manner, security of the pass-set entry is improved by dividing presentation and selection/navigation between the authenticator device and I/O device.

In a further implementation, the menus are securely presented to the user via aural, visual or audiovisual messages in the I/O device, so that the menus cannot be overheard or seen by others. In one example, the user navigates the menus or matrix and makes selections with the user controls interface at the authenticator device. In this manner, ease of menu navigation and item selection is improved since the user controls interface at the authenticator device may be larger and/or offer more features as it is on a larger device.

Figure 2D:
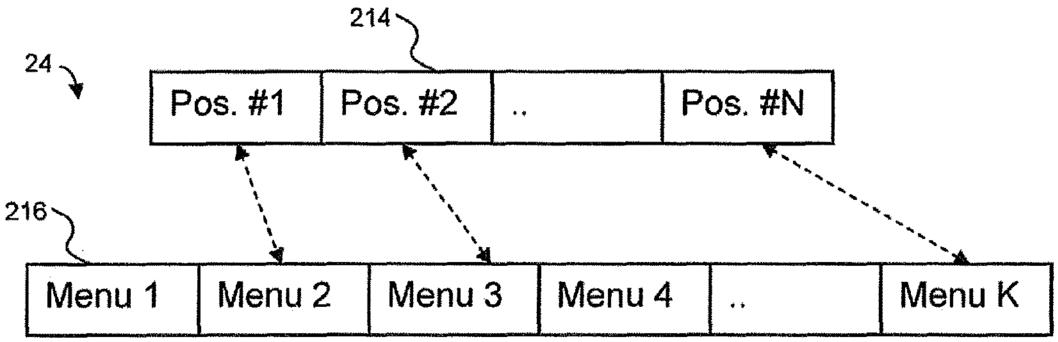
FIG. 2D is a diagram illustrating the relationship between pass-set entry menus and positions of a pass-set.

FIG. 2D shows a relationship 24 between an exemplary pass-set 214 and a set of pass-set entry menus 216. Each position of the pass-set 214 corresponds to one of the pass-set menus 216. However, not every menu corresponds to a position of the pass-set 214. This scheme is designed to increase security because it would be more difficult for a perpetrator to guess the pass-set. In other words, the relationship 24 between the pass-set entry menus 216 and positions of the pass-set 214 may not be one-to-one. However, it is evident, based on the relationship 24, that the number of the pass-set entry menus 216 must be equal to or great than the number of the positions of the pass-set 214.

Figure 2E:
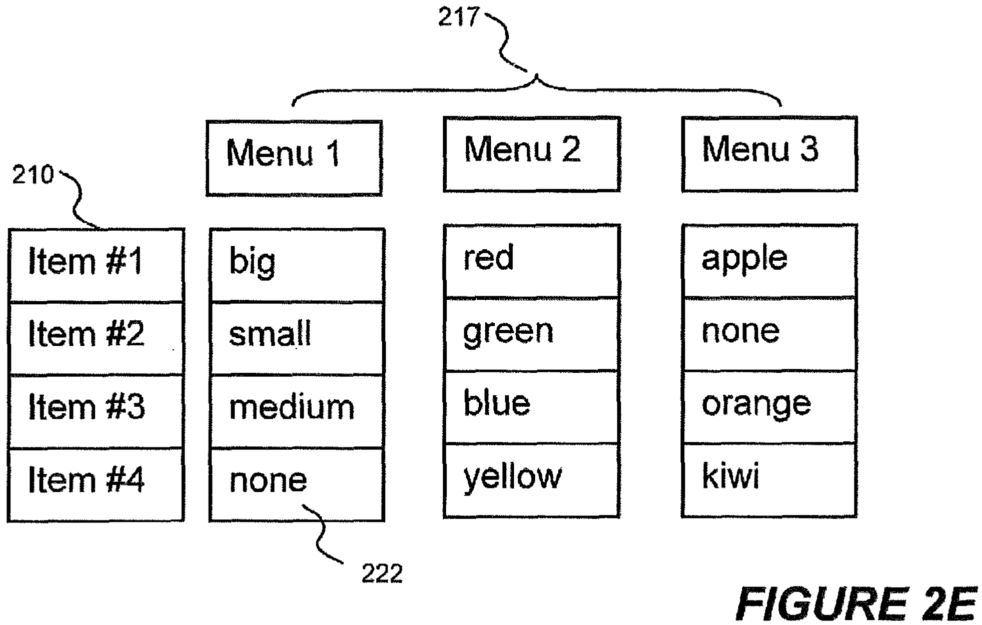
FIG. 2E is a diagram illustrating an exemplary order independent pass-set entry menu with directly referenced item data.

Referring to FIG. 2E, there is shown an exemplary set of three pass-set entry menus 217, each having four items 210. When each of the menus 217 is presented to a user, the user makes a selection of one of the items 210. For example, the items in Menu 2 are item number 1 'red', 2 'green', 3 'blue' and 4 'yellow'. Instead of using numerical item numbers, the item number may also be in different forms such as alphabets (e.g., a, b, c and d) or other suitable means to identify the item itself. Although the number of items in this exemplary set of menus 217 is constant (i.e., four), the number of items may be different for each menu. In addition, the number of items may be any positive integer greater than one.

Assuming the pass-set 206 of FIG. 2C is the correct pass-set stored in an authenticator, a user would only be authenticated only if the user had selected item #2 'small' in Menu 1, item #4 'yellow' in Menu 2, and item #1 'apple' in Menu 3. The item "none" 222 in Menu 1 is designed for those menus that do not correspond to any position of the pass-set.

Figure 2F:
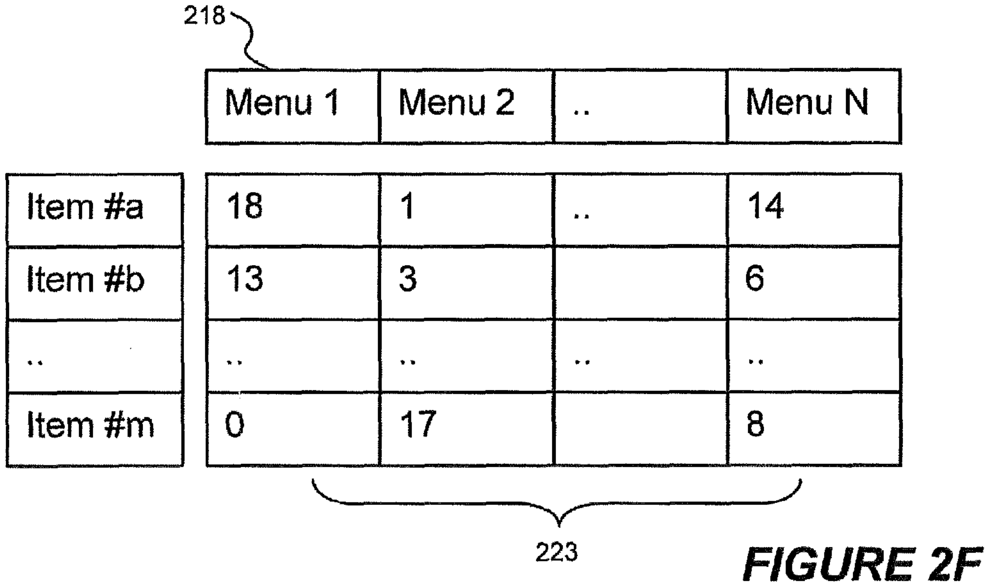
FIG. 2F is a diagram illustrating an exemplary pass-set entry menu with indirectly referenced item data (i.e., numerical indices for item data).
Figure 2H:
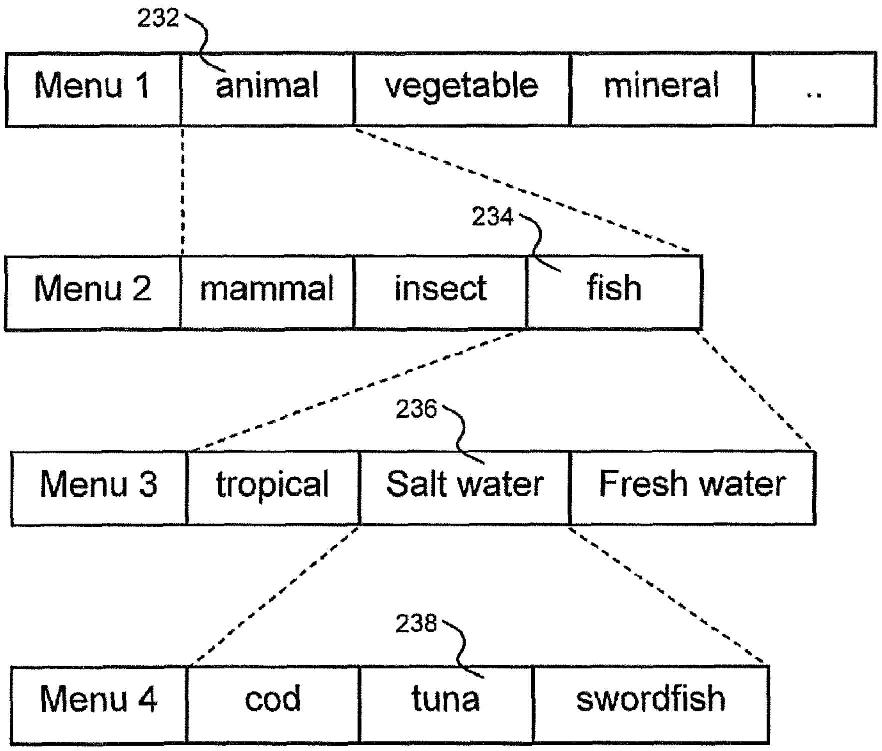
FIG. 2H is a diagram showing an exemplary set of pass-set entry menus that is order dependent, that is, a current menu is dynamically created based on the selection a user makes from a previous menu.
Figure 2I:
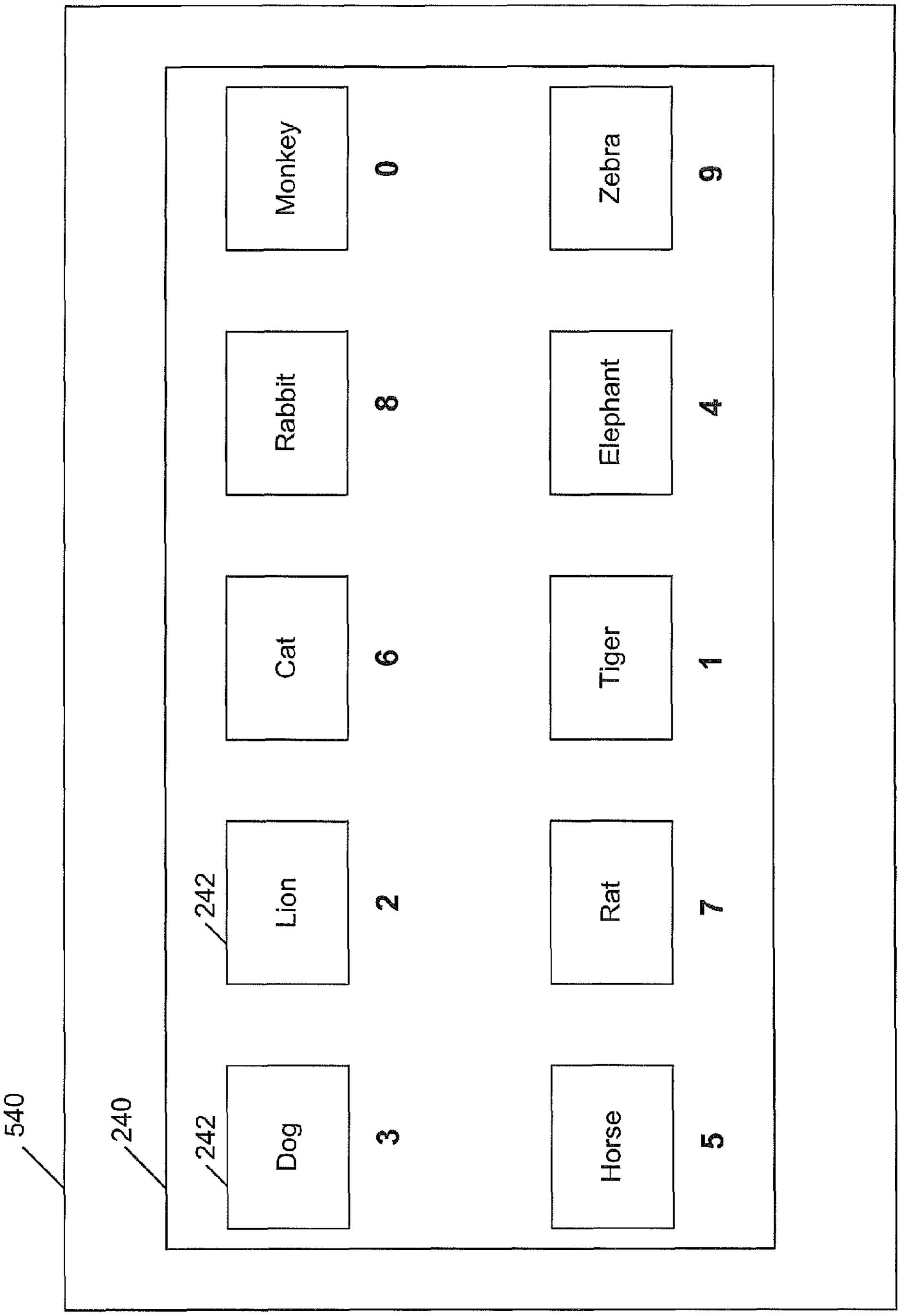
FIG. 2I is a diagram illustrating an exemplary pass-set menu presented to a user in visual format on a display.

FIG. 2I is a diagram illustrating an exemplary pass-set menu presented to a user in visual format on an authenticator display 540. For example, the user can see a matrix 240 of ten animal images 242 on their handset. Although illustrated as a 2×5 matrix having ten identifiers, matrix 240 can be of any size. The numbers 0 through 9 assigned randomly to each picture, where each number serves as an identifier for the assigned animal image. Assume the user pass-set is {HORSE, HORSE, TIGER, TIGER}. Since the horse image has the assigned identifier 5, the user would scroll to the number 5 and press enter to select. Upon selection, the scroll bar is started in a randomized place so the user would again scroll to the number 5 and press enter to select. Continuing entry of the pass-set, since the tiger image has the assigned identifier 1, the user would scroll to the number 1 and press enter to select. Upon selection, the scroll bar is started in a randomized place so the user would again scroll to the number 1 and press enter to select. Thus, in this manner, the pass-set {HORSE, HORSE, TIGER, TIGER} is entered and an observer has no idea what was selected as they cannot hear the identifier being selected.

Advantageously, visual choices are presented without necessarily requiring privacy. Furthermore, pass-set system components are distributed between the handset and headset, providing increased security to overcome malware such as keystroke recording or voice recording virus software.

To generate pass-set entry menus from an authentication application, the authenticator possesses all of the information for the authentication. In one example where menus are displayed visually on the authenticator device, the pass-set menus are typically on the authenticator device, and the I/O device communicates encoded (and preferably encrypted) numbers/letters to the authenticator device as PIN entries. Alternative based on the above would be to send menus first to the authenticator device from the I/O device (preferably after a mutual authentication) and then send the appropriate code. The advantage of this alternative is that the domain of possibilities is unknown to the system until logon time which makes guessing even harder. Furthermore, easily remembered menus are transported on the portable I/O device and the local system I/O device providing the user interface does not have to download them from the authenticator device if it is different.

In a further example, menus are sent from the host/authenticator device as audio, which is preferably encrypted. The I/O device may store a fixed set of menus, and the host/authenticator device sends (preferably encrypted and after mutual authentication) code that causes the I/O device to play the custom audio menus generated in the I/O device.

In one example, meta-data or meta-information for generating each of the one or more pass-set entry menus are transmitted to the I/O device. The meta-data comprises the relationship between pass-set entry menus and the position of the pass-set, how many items, order of the items, item data. The item data may be directly or indirectly referenced. The number of items in a pass-set entry menu may be varied and the order of the items is optionally randomized when the authentication application creates the menu. As a result, the menu presented to the user may be different each time, even if the menu is meant for entering a selection of a same position in a pass-set. These features may render the overseen or heard user's selection useless because the menu may be presented with different number of items in a totally different order.

In one example, because item data in each of the menus are securely presented to the user with aural, visual or audiovisual messages, each of the item data must be in a playable format (e.g., waveform audio format (".wav file"), QuickTime movie file (".mov file")). One technique is to store the item data in the playable format (i.e., directly referenced) on the authenticator then transmitting to the I/O device. Alternatively, the item data may be stored as non-playable forms (e.g., text file, phoneme file, etc. The playable format of the item data is then generated in the I/O device from the received corresponding text file (e.g., text-to-speech (TTS)).

Alternatively, the item data may stored as numerical indices 223 (i.e., indirectly referenced) in the pass-set entry menus 218 as shown in FIG. 2F. After the numerical indices are received in the I/O device, a lookup table 27, as shown in FIG. 2G, is used to dereference the numerical indices 224 into item data 226. The playable format of the item data can then be generated.

When more than one pass-set entry menus are presented to a user, the menus can be order independent or dependent. The order dependent pass-set entry menus are explained using an example in FIG. 2H, in which a first menu (Menu 1) for the user to select includes items such as "animal", "vegetable", "mineral", etc. The correct selection is "animal" 232. A second menu (Menu 2) is then presented to the user with choices "mammal", "insect", and "fish". The correct selection is "fish" 234. A third menu (Menu 3) and a fourth menu (Menu 4) are presented in similar manner. When selected items (i.e., "animal" 232, 'fish" 234, "Salt water" 236 and "tuna" 238) are all valid, the user will be authenticated.

Referring to FIGS. 3A-3B, there are shown two different manners by which a user selects an item from a pass-set entry menu, according to various examples. In FIG. 3A, a user 302 sees menu 240. The valid pass set 310 has three positions with elements "Elephant", "Monkey" and "Rabbit". The user manipulates controls on the I/O device 41, in this case a headset 306 until the index 243 of the menu item 242 corresponding to the pass set position is heard. When the desired menu item is heard, the user selects it using the controls of the I/O device 41. The user 302 will be authenticated if the user 302 selects all the correct menu item numbers in the proper order corresponding to the pass set 310. Because the aural message can only be heard by the user 302 via the headphone of the headset 306, a perpetrator would not know what items are selected thereby the pass-entry is secured.

Another exemplary pass-entry method is shown in FIG. 3B. The valid pass-set 310 has three positions with elements: "4", "0", and "8". In this example, there are three menus and each of the respective menus contains 10 items, namely the numbers 0-9. The user manipulates a control (physical or virtual on a screen) 307 separate from the headset. As the user manipulates the control, the menu items are heard as audio in the headset 306. When the desired menu item is heard corresponding to a pass-set position, the user uses the physical control to select it. The next menu is then available to be navigated by the control. The user 302 will be authenticated if the user makes three correct selections to all of the pass-set entry menus presented.

While the exemplary methods shown in FIGS. 3A-3B are described for a headset 306, other personal devices that allow securely presenting aural, visual or audiovisual messages can be substituted to achieve the goals of the present invention. In one example, in FIGS. 3A-3C, the user 302 makes selections using a user-controls interface of an authenticator device 51 as shown in FIG. 5.

Figure 5:
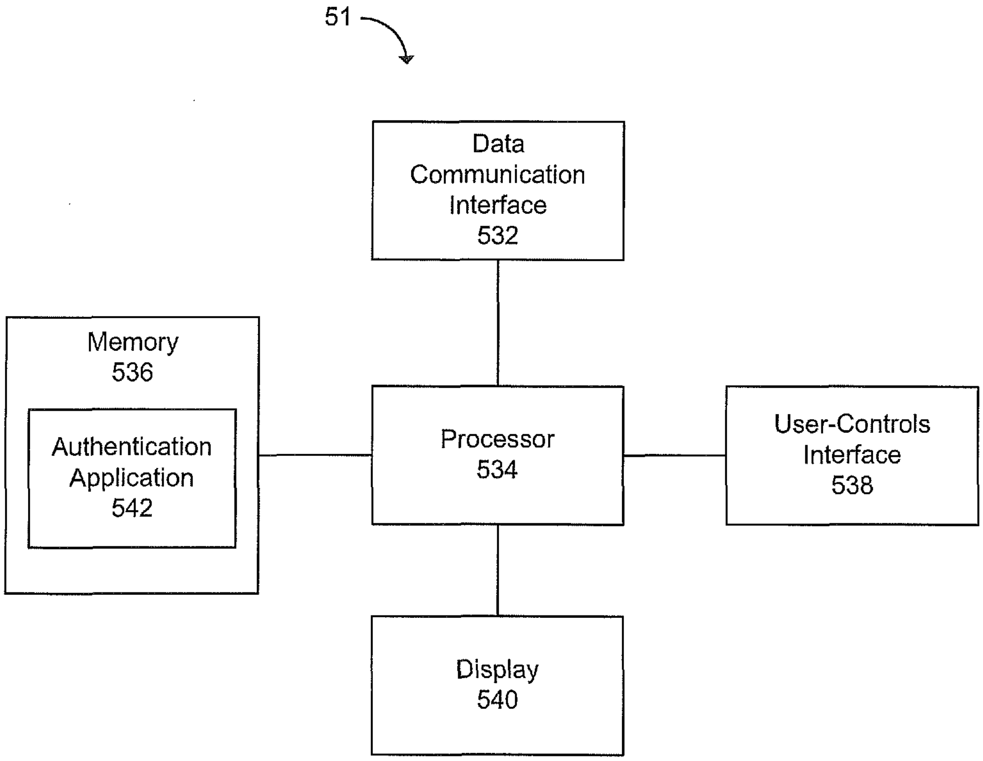
FIG. 5 is a diagram illustrating salient components of an authenticator device for secure pass-set entry.

FIG. 5 is a diagram illustrating salient components of an authenticator device 51 for secure pass-set entry. In one example, the authenticator device 51 includes a processor 534, to which a data communication interface 532, a memory device 536, a user-controls interface 538, and a display 540 are coupled. The data communication interface 532 is configured to provide data transmission to and from an I/O device. The processor 534 together with a pass-set authentication application 542 installed thereon on the memory device 536 are configured to generate output messages containing the one or more pass-set entry menus. The output messages may be aural, visual or audiovisual. In one example, the aural output messages are sent via data communication interface 532 for secure output to the user at the I/O device. The display 540 is configured to present the generated visual output messages.

In one example, the user-controls interface 538 is configured to facilitate a user to traverse each of the pass-set entry menus presented in the display 540 and/or at the I/O device 41 to confirm a selection of an item from the menu. The user-controls interface 538 may comprise a variety of switches, buttons and other controls, for example, mechanical button, slide switch, touch sense control, mouse, keyboard, voice recognition system with a microphone, or other interfaces that recognize user's intention to make a selection from a pass-set entry menu.

Figure 4:
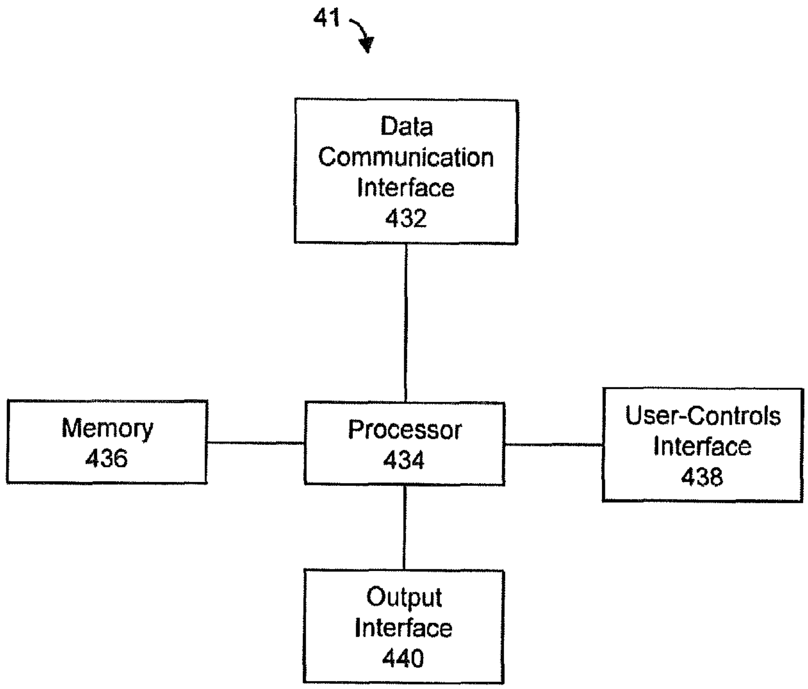
FIG. 4 is a diagram illustrating salient components of an exemplary I/O device for secure pass-set entry.

FIG. 4 is a diagram illustrating salient components of an exemplary I/O device 41 for secure pass-set entry. According to one example, the I/O device 41 includes a processor 434, to which a data communication interface 432, a memory device 436, a user-controls interface 438, and an output interface 440 are coupled.

The data communication interface 432 is configured to provide data transmission to and from an authenticator. The processor 434 together with a pass-set authentication application installed thereon and the memory device 436 are configured to generate output messages containing the one or more pass-set entry menu. The output messages may be aural, visual or audiovisual. The output interface 440 is configured to securely present the generated output messages in such way that only the user of the I/O device 41 can see or hear. For example, a headphone of a headset allows aural messages only for a user to listen to. A personal heads-up display may be incorporated in a visor or helmet only for the wearer to view. One or more haptic devices may also or alternatively be used to present pass-entry choices or menus in tactile form to the user (e.g., by vibrating the I/O device).

In one example, the user-controls interface 438 is configured to facilitate a user to traverse each of the pass-set entry menus presented in the output interface 440 and to confirm a selection of an item from the menu. The user-controls interface 438 may comprise a variety of switches, buttons and other controls, for example, mechanical button, slide switch, touch sense control, mouse, keyboard, voice recognition system with a microphone, motions sensor (nodding head for yes), or other interfaces that recognize user's intention to make a selection from a pass-set entry menu.

Figure 6:
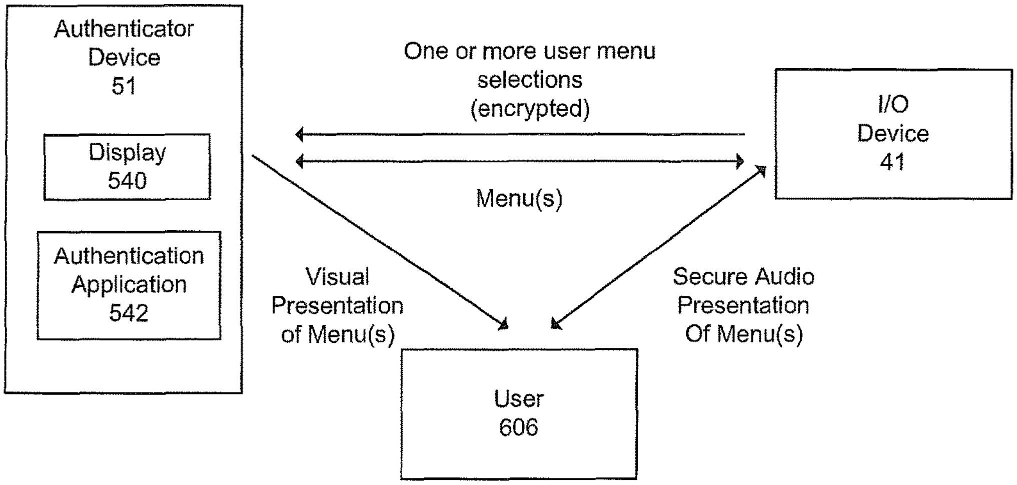
FIG. 6 is a diagram illustrating an exemplary system and method for secure pass-set entry utilizing visual presentation of menus and secure audio presentation of menus.

FIG. 6 is a diagram illustrating an exemplary system and method for secure pass-set entry utilizing visual presentation of menus and secure audio presentation of menus. The secure pass-set entry includes an authenticator device 51 and an I/O device 41. The authenticator device 51 includes an authentication application 542 configured to generate a pass-set menu to output in visual format on a display 540 for visual presentation to a user 606. In one example, the authentication application 542 is configured to output audio corresponding to the pass-set menu to the I/O device 41, which is configured to receive the audio corresponding to the pass-set menu from the authenticator device 51. In a further example, the authentication application 542 transmits audio choices to I/O device 41 in response to the user manipulating controls at I/O device 41. The audio menus transmitted from authenticator device 51 to I/O device 41 may be indexes or wavefiles.

In a further example, instead of audio transmission from authenticator device 51 to I/O device 41, audio is stored at the I/O device 41 corresponding to a plurality of selectable choices. For example, the audio stored at the I/O device 41 may be simple universal numerical identifiers such as numerals 0-9. Such universal numerals 0-9 may correspond to choices available for selection from the pass-set menu viewed on display 540.

In one example, the pass-set menu is a matrix of images as shown in FIG. 2I, wherein each image is designated with a unique identifier. For example, this unique identifier is a unique numeric identifier and the audio corresponding to the pass-set menu securely output at the output interface of the I/O device 41 is the unique numeric identifier. The start point of the audio corresponding to the pass-set menu is randomized.

The I/O device 41 includes an output interface configured to securely output audio corresponding to the pass-set menu to the user 606, a user input interface configured to receive user actions/selections to navigate the pass-set menu and receive user menu selections, and a data interface for receiving audio corresponding to the pass-set menu from the authentication device 51 and transmitting encrypted user menu selections to the authenticator device 51. In one example, the output interface of the I/O device 41 is a headphone allowing the user to listen to the audio corresponding to the pass-set menu securely. In one example, the user input interface of the I/O device 41 is an interface configured to navigate a list of menu items in a forward and reverse direction. The authenticator application is configured to receive user menu selections from the I/O device 41 and assemble the user menu selections into a user-entered pass-set.

In one example, each of the one or more pass-set entry menus is independent to each other and are not stored at the I/O device 41. The meta-data for generating all of the menus is encoded and sent from the authenticator device 51 to the I/O device 41 at once. The user 506 makes a selection (e.g., item number of the selected item) in each of the menus until a user entered pass-set is assembled in the I/O device 41. Then the user entered selections are optionally encoded before being sent back to the authenticator device 51.

In one example, the pass-set entry menus are order dependent (e.g., FIG. 2H) and are not stored at the I/O device 41. The meta-data for generating the pass-set entry menus is encoded and sent from the authenticator device 51 to the I/O device 41 one menu at a time. The user selection or item number is transmitted back to the authenticator 502 after the user 506 makes a selection in each menu.

In a further example, pass-set entry menus are generated at I/O device 41 and then transmitted to authenticator device 51. The pass-set entry menus are presented visually to the user at display 540 of the authenticator device 51. Audio is output at the I/O device 41 corresponding to a plurality of selectable choices. User menu selections are received at the I/O device 41 and transmitted to authenticator device 51.

Figure 7:
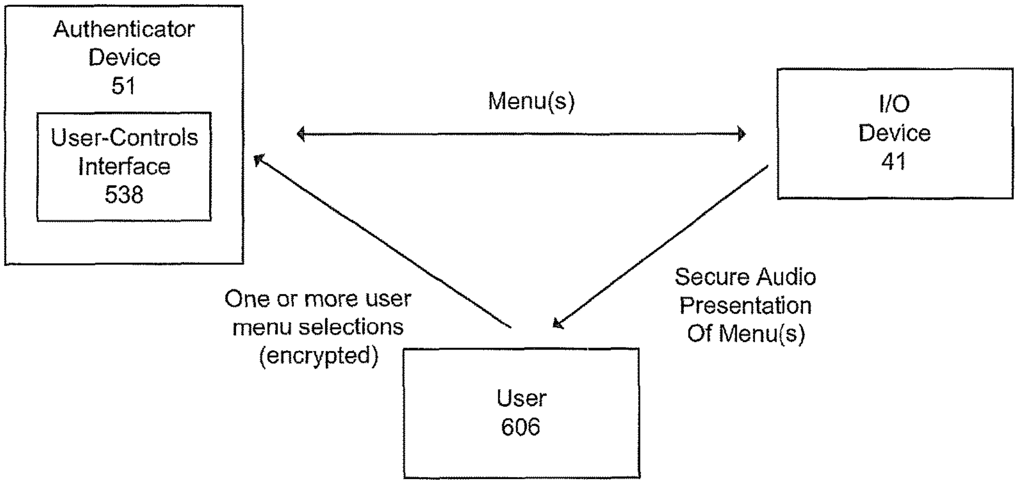
FIG. 7 is a diagram illustrating an exemplary system and method for secure pass-set entry utilizing menu navigation at an authentication device and secure audio presentation of menus at an I/O device.

FIG. 7 is a diagram illustrating an exemplary system and method for secure pass-set entry utilizing menu navigation at an authentication device 51 and secure audio presentation of menus at an I/O device 41. The system for secure pass-set entry includes an authenticator device 51 and an I/O device 41. The authenticator device 51 includes an authentication application configured to generate a pass-set menu and configured to transmit audio corresponding to the pass-set menu to I/O device 41. In one example, the pass-set menu includes a plurality of ordered items to be output in audio format to the user, wherein the start point within the plurality of ordered items output in audio format to the user is randomized. In one example, the authenticator application is configured to assemble the user menu selections into a user-entered pass-set.

The authenticator device 51 also includes a user-controls interface 538 configured to receive user actions from user 606 to navigate the pass-set menu and receive user menu selections, where responsive to the user actions audio corresponding to a new menu position or a new menu is transmitted to the I/O device 41 from the authenticator device 51. In one example, the user-controls interface 538 is a scroll wheel.

The I/O device 41 is configured to receive the audio corresponding to the pass-set menu from the authenticator device 51. The I/O device 41 includes a user output interface configured to securely output audio corresponding to the pass-set menu to the user 606. In one example, the user output interface is a headphone allowing the user to listen to the audio corresponding to the pass-set menu securely.

In FIG. 6 and FIG. 7, data transmissions between the authenticator device 51 and the I/O device 41 may be encoded or encrypted to increase the security. For example, a data transmission protocol comprising substantially high level of security should be used for transporting the meta-data and the user entered pass-set or selection. The authentication application installed on the authenticator device 51 may also include various security measures, to increase the security confidence of the authentication process performed by these three exemplary systems.

Figure 8A:
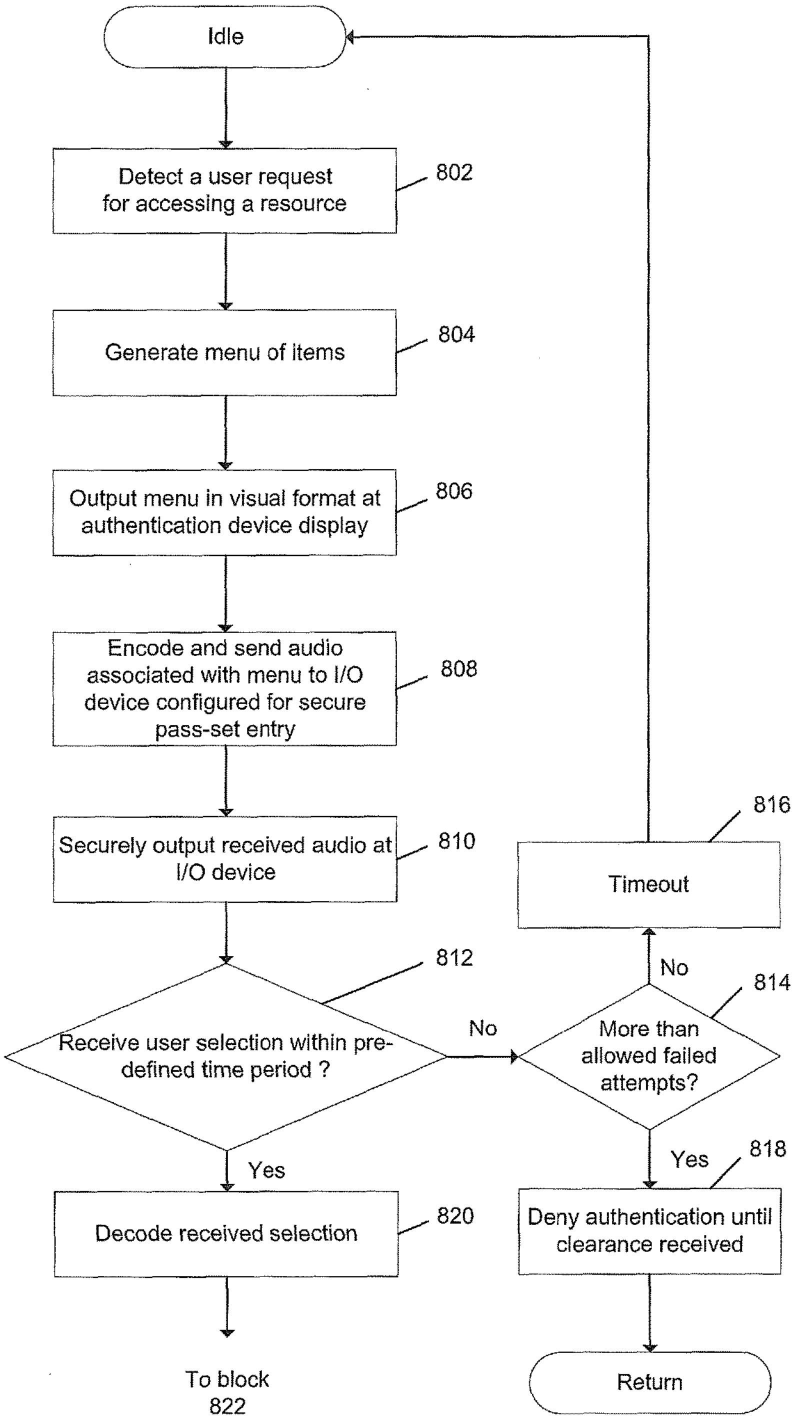
FIGS. 8A and 8B are a flow diagram illustrating an exemplary process by which an authenticator device outputs a menu in visual format and an I/O device securely outputs audio to a user, in response to the user's request to access a resource.
Figure 8B:
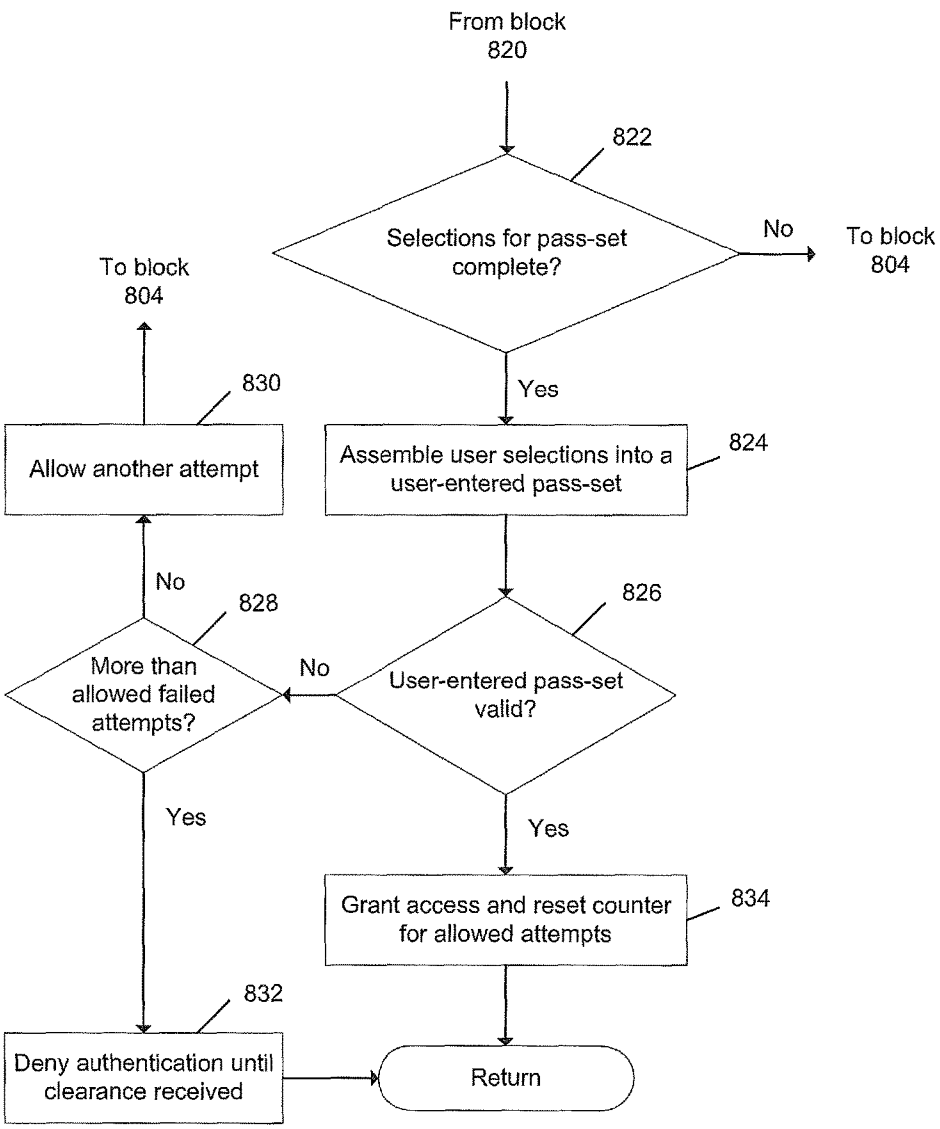

FIGS. 8A and 8B are a flow diagram illustrating an exemplary process by which an authenticator device outputs a menu in visual format and an I/O device securely outputs audio to a user, in response to the user's request to access a resource.

The process holds an idle state until the authenticator device detects a user request at block 802. At block 804, a pass-set entry menu is generated. At block 806, the pass-set menu is output in visual format at an authentication device display. At block 808, the authenticator device encodes and sends audio associated with the generated pass-set menu to an I/O device configured for secure pass-set entry. This is an optional step and is only needed if the I/O device does not have the menu choices already. At block 810, the received audio is securely output at the I/O device for the user to make a selection. As described previously, in a further example audio presenting the user with selectable choices corresponding to the pass-set menu is generated and output directly at the I/O device and need not be sent from authenticator device.

At decision block 812, the authenticator device waits for receiving the user selection within a pre-defined time period. If no at decision block 812, the process moves to another decision block 814. If the user has attempted pass-entry more than the allowable failed attempts, and the result of decision block 814 is yes and the user is denied access until an authorized agency clears the situation at block 818. Otherwise, the authenticator device issues a time out message to the I/O device at block 816 and the process goes back to the idle state waiting for another request.

If yes is the result of decision block 812, the authenticator device decodes the received user selection if required at block 820. Next at decision block 822, it is determined whether selections for the pass-set are complete. If no, the process returns to block 804 to create the subsequent pass-set entry menu until decision block 822 becomes no. If yes at decision block 822, at block 824 the user selections are assembled into a user entered pass-set.

At decision block 826, it is determined whether the user enter pass-set is valid (i.e., the received user pass-set is compared to the correct pass-set in a database). If yes at decision block 826, at block 834 permission to access the resource is granted to the user and the counter for the number of allowable pass-set entry attempts is reset. The process goes back to the idle state.

Otherwise if decision block 826 is no, the process moves to decision block 828. At decision block 828, it is determined whether the number of pass-set entry attempt has exceeded the number of allowed attempts. If yes, the user is denied access until the situation can be cleared by an authorized agency at block 832 and the process goes back to the idle state thereafter. Otherwise, the process moves to block 830 in which the authenticator device allows the user another pass-set entry attempt. As a result, the process moves back to block 804 to repeat the authentication procedure until either the permission is granted or denied.

Figure 9A:
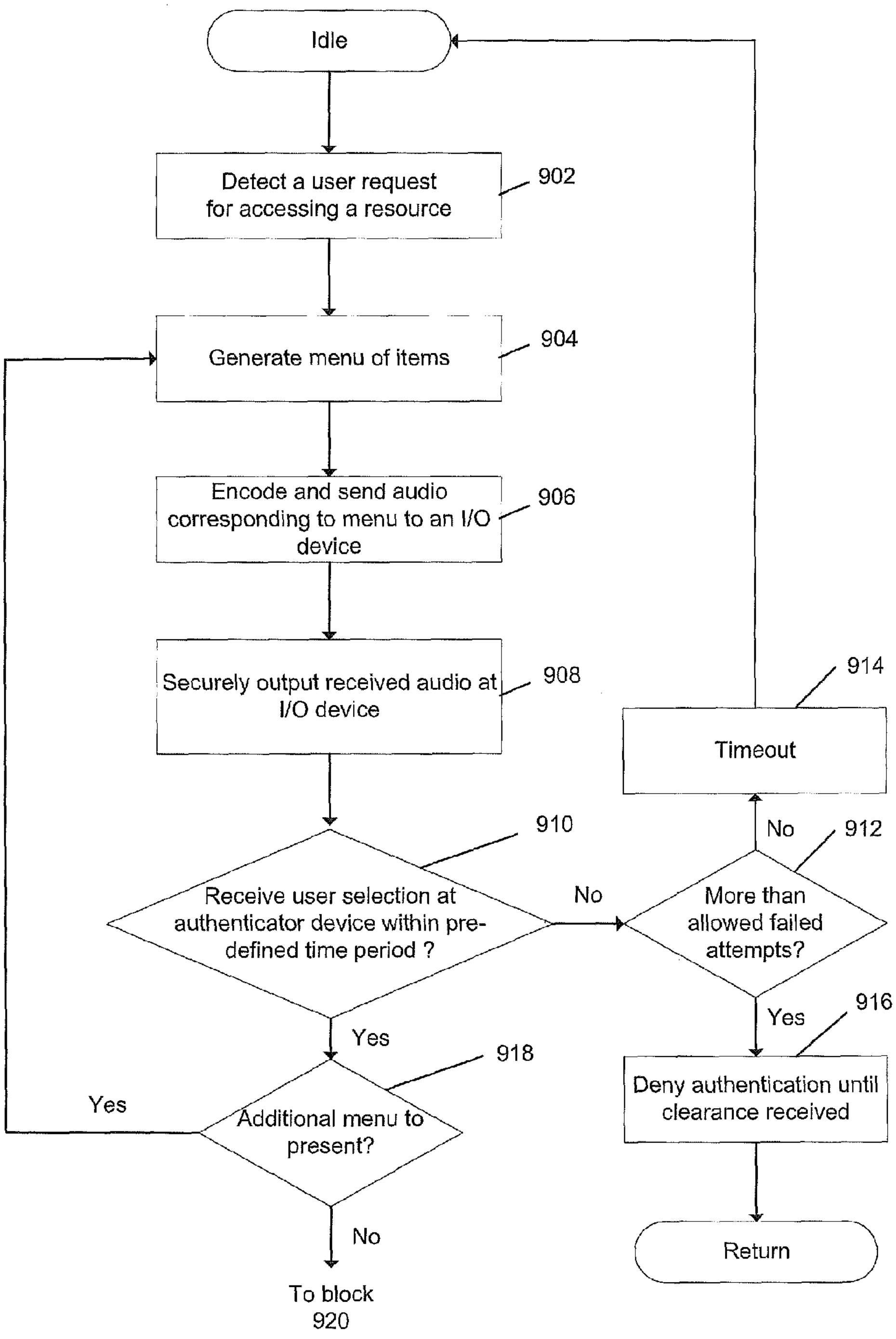
FIGS. 9A and 9B are a flow diagram illustrating an exemplary process by which an I/O device securely outputs audio to a user and an authenticator device user-controls interface receives user selections, in response to the user's request to access a resource.
Figure 9B:
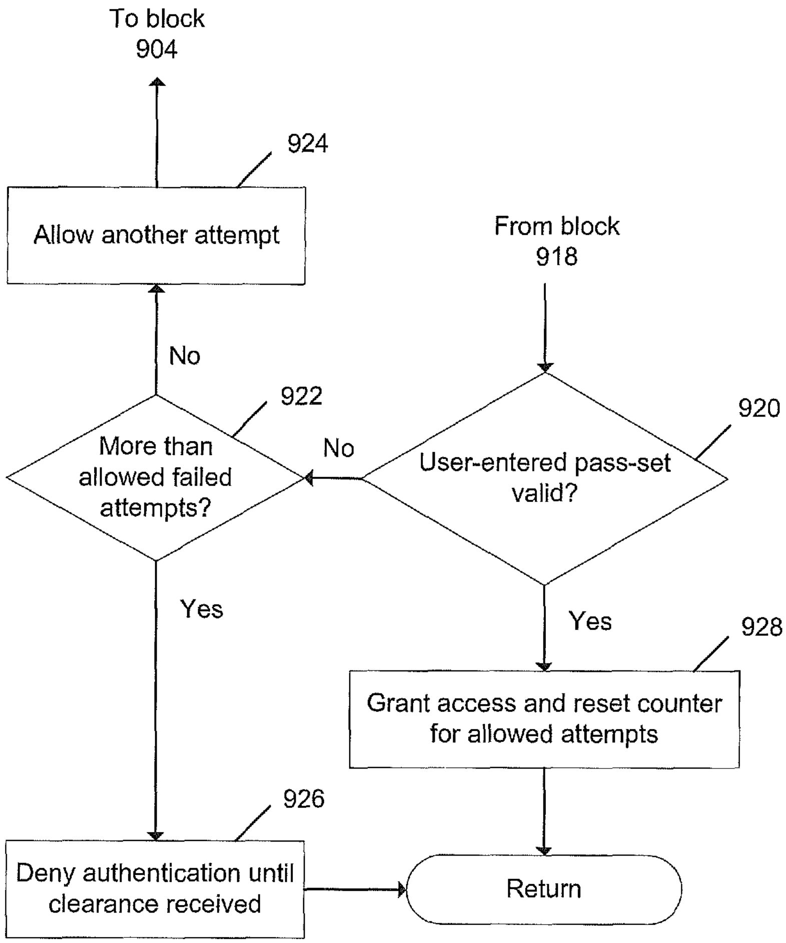

FIGS. 9A and 9B are a flow diagram illustrating an exemplary process by which an I/O device securely outputs audio to a user and an authenticator device receives user selections, in response to the user's request to access a resource. The process holds an idle state until the authenticator device detects a user request at block 902. At block 904, a pass-set entry menu is generated. In one example, the pass-set menu includes a plurality of ordered items to be output in audio format to the user with a start point within the plurality of ordered items randomized. At block 906, the authenticator device encodes and sends audio associated with the current state of the authenticator user control and the generated pass-set menu to an I/O device configured for secure pass-set entry. This audio can change as the user manipulates the user control. In one example, audio or an index to a wavefile is transmitted to the I/O device from the authenticator device. In a further example, a menu comprising wavefiles to be stored in the I/O device are transmitted from the authenticator device to the I/O device. Following user selection, an indice or next/previous item command corresponding to a current control state is sent to the headset from the authenticator device. The process is then repeated for other selections.

At block 908, the received audio is securely output at the I/O device for the user to make a selection. At decision block 910, the authenticator device waits for receiving the user selection within a pre-defined time period, where the user selection is made at a user-controls interface at the authenticator device. If no at decision block 910, the process moves to another decision block 912. If the user has attempted pass-entry more than the allowable failed attempts, and the result of decision block 912 is yes, the user is denied access until an authorized agency clears the situation at block 916. Otherwise, the authenticator device issues a time out message to the I/O device at block 914 and the process goes back to the idle state waiting for another request.

If yes is the result of decision block 910, at decision block 918 it is determined whether there is an additional menu to present to the user. If yes at decision block 918, the process returns to block 904. If no at decision block 918, at decision block 920 is determined whether the user enter pass-set is valid (i.e., the received user pass-set is compared to the correct pass-set in a database). If yes at decision block 920, at block 928 permission to access the resource is granted to the user and the counter for the number of allowable pass-set entry attempts is reset. The process goes back to the idle state.

Otherwise if decision block 920 is no, the process moves to decision block 922. At decision block 922, it is determined whether the number of pass-set entry attempt has exceeded the number of allowed attempts. If yes, the user is denied access until the situation can be cleared by an authorized agency at block 926 and the process goes back to the idle state thereafter. Otherwise, the process moves to block 924 in which the authenticator device allows the user another pass-set entry attempt. As a result, the process moves back to block 904 to repeat the authentication procedure until either the permission is granted or denied.

In certain examples, instead of randomizing the items on a given menu, the menu order is retained, only the starting point of the menu list is randomized. For example, assume the user PIN is {PEACH, FLY, IRON}. The user navigates through each item in a menu using up/down buttons (up takes the user forward in the menu, down takes the user backwards). At each position, the menu item is heard as an audible prompt.

The menu collection is as follows:

| |
|---|
| menu #1: {apple, peach, pear, watermelon} |
| menu #2: {beetle, butterfly, ladybug, fly} |
| menu #3: {gold, silver, iron, rhubidium} |

When the menus are played for user selection, the first item they hear is randomized. For example, menu #1 starts on item 4, menu #2 starts on item 2, and menu #3 starts on 4. The menus can wrap, whereby a down action on the last item takes you to the first item, and up action on first item takes you to the last item. The user item selected for each menu is captured by the application software (by keeping track of up/downs and the starting location to control navigation) and sent to the PIN/password authenticator (encrypted or not as desired). For example, the application would report {2,4,3} as the items selected from the collection of menus.

The navigation control could also be a linear or circular slider, or rotating wheel, or a linear or circular collection of buttons representing each choice. For the rotating wheel or linear button navigation controls, the menu order is maintained but the choices are distributed circularly-rotated among the buttons based on starting point. On sliders and wheels, the number of menu items traversed can agree with the speed of the finger on the control allowing for large quantities of choices to be bypassed as the user searches for the desired item. As they narrow in on their choices and move the finger more slowly, the resolution can increase.

The actual location of a menu item is still randomized. An observer cannot detect which item is selected because the relative starting location is not known. In another aspect, the menu items are part of an ordered set (numerical, alphabetical, or some other property of the items).

If the PIN is numerical, a randomized collection of numbers is often more difficult to sort through. Advantageously, if the menu items are numbers, and presented in increasing or decreasing value, the user can more easily navigate to the correct choice. This is significant when there are a significant number of choices on each menu. If the user can tell "where they are" in the set of selections by being aware of a inherent order of the choices and listening to a sampling of choices, they can skip more quickly (on a slider for example) to the region of interest for their selection. An example of this might be entering a social security number, and having 1000 choices on the first menu, 100 choices on the second, and 10,000 choices on the last one. With large numerical choices for each menu, having only 3 menus is many times stronger than a standard 4-digit PIN. Non-numerical menus can also take advantage of this by having alphabetized categories for animals, flowers, etc. and achieve very large user choice spaces (and therefore security).

Figure 10A:
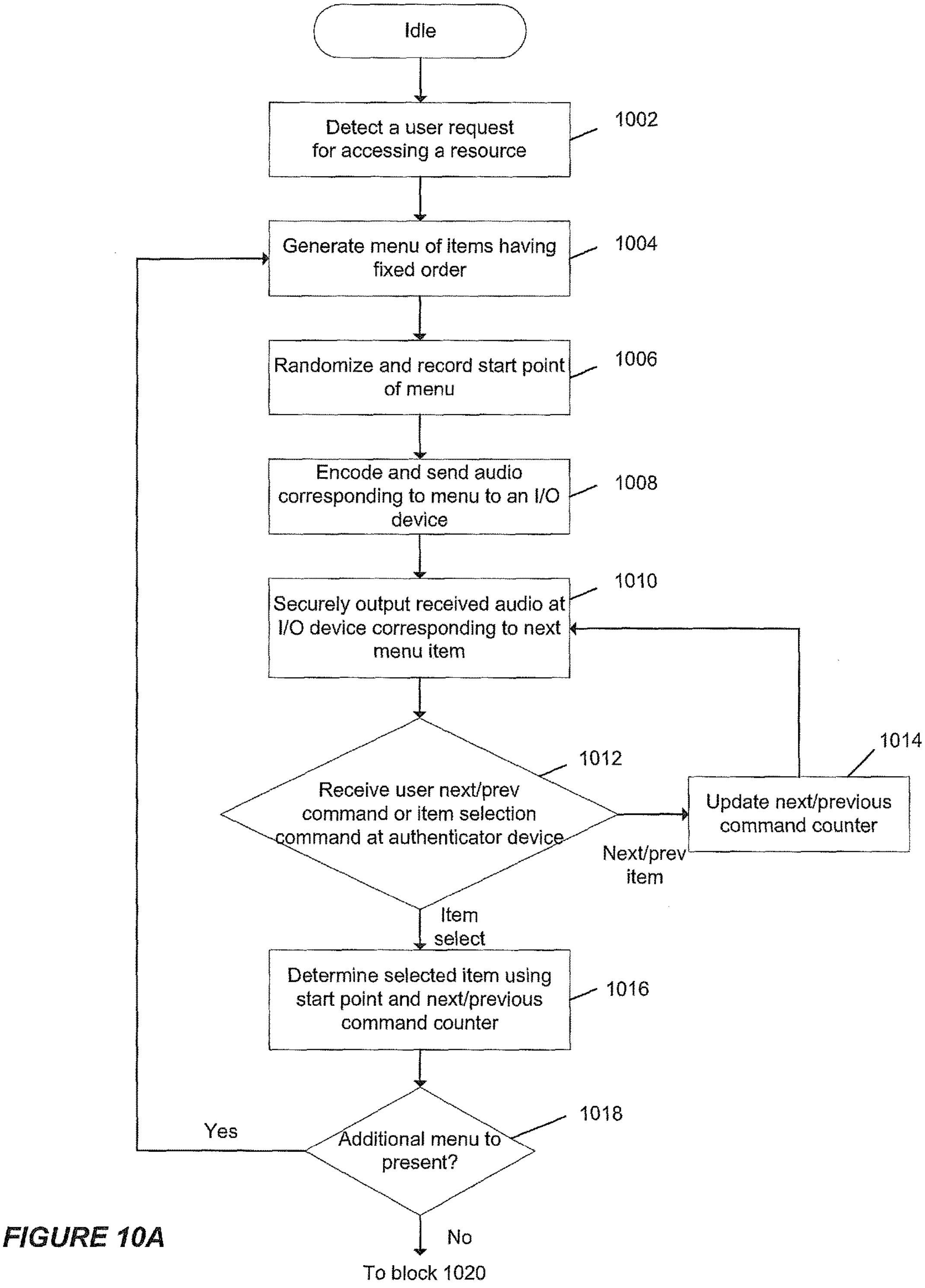
FIGS. 10A and 10B are a flow diagram illustrating an exemplary process by which menus are presented to a user having a random start point and user menu previous/next navigation is tracked, in response to the user's request to access a resource.
Figure 10B:
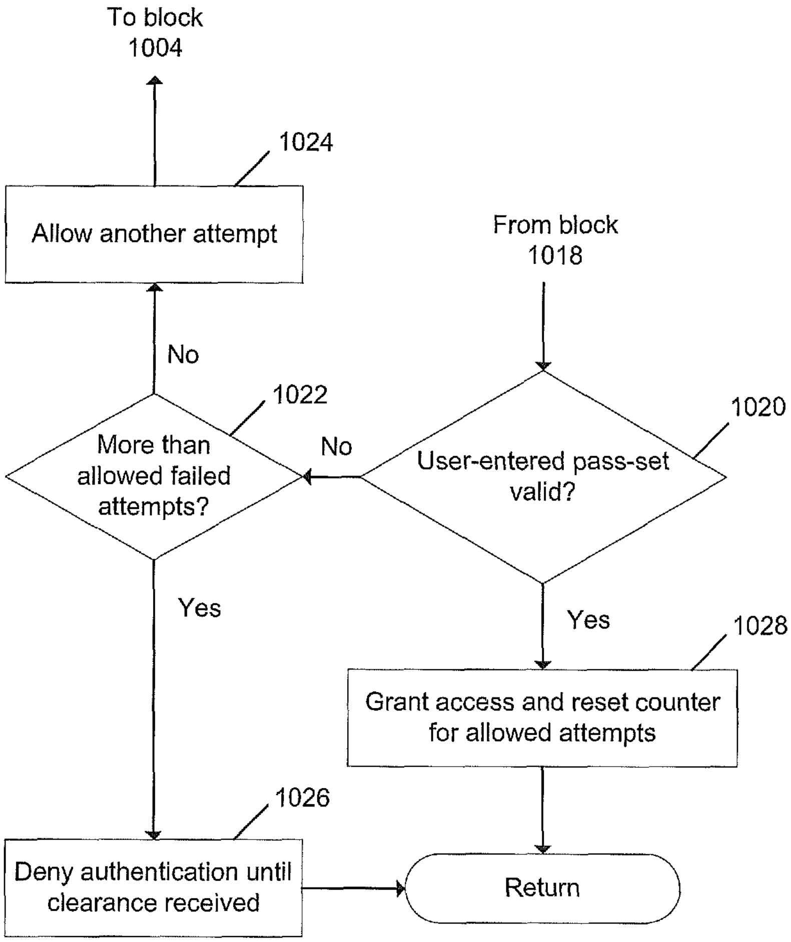

FIGS. 10A and 10B are a flow diagram illustrating an exemplary process by which menus are presented to a user having a random start point and user menu previous/next navigation is tracked, in response to the user's request to access a resource.

The process holds an idle state until the authenticator device detects a user request at block 1002. At block 1004, a pass-set entry menu is generated having a fixed order of items. At block 1006, the authenticator or I/O device randomizes the start point of the menu at which to begin presenting items to the user. The start point of the menu is recorded for use in determining the user item selection. At block 1008, in one embodiment, the authenticator device encodes and sends audio corresponding to the next menu item to the I/O device. In a further example, the menus are not originated at the authenticator. At block 1010, the received audio corresponding to the next menu item or previous menu item is securely output at the I/O device.

At block 1012, it is determined whether a user next/previous item command has been received or an item selection command has been received at the authenticator device. If a next/previous item command has been received, at block 1014 a next/previous item command counter is updated as appropriate based on whether the user has selected next item or previous item. The next/previous item command counter is utilized in determining where the user is within the menu of items relative to the recorded randomized start point. Following block 1014, the process returns to block 1010. If an item selection command has been received at block 1012, at block 1016 the selected item is determined using the recorded start point and the next/previous item command counter.

At decision block 1018 it is determined whether there is an additional menu to present to the user. If yes at decision block 1018, the process returns to block 1004. If no at decision block 1018, at decision block 1020 is determined whether the user enter pass-set is valid (i.e., the received user pass-set is compared to the correct pass-set in a database). If yes at decision block 1020, at block 1028 permission to access the resource is granted to the user and the counter for the number of allowable pass-set entry attempts is reset. The process goes back to the idle state.

Otherwise if decision block 1020 is no, the process moves to decision block 1022. At decision block 1022, it is determined whether the number of pass-set entry attempt has exceeded the number of allowed attempts. If yes, the user is denied access until the situation can be cleared by an authorized agency at block 1026 and the process goes back to the idle state thereafter. Otherwise, the process moves to block 1024 in which the authenticator device allows the user another pass-set entry attempt. As a result, the process moves back to block 1004 to repeat the authentication procedure until either the permission is granted or denied.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, while the I/O device has been shown and described as a headset comprising a binaural headphone having a headset top that fits over a user's head, other headset types including, without limitation, monaural, earbud-type, canal-phone type, etc. may also be used. Depending on the application, the various types of headsets may include or not include a microphone for enabling voice recognition. Moreover, while some of the exemplary embodiments have been described in the context of a headset, those of ordinary skill in the art will readily appreciate and understand that the methods, system and apparatus of the invention may be adapted or modified to work with other types of head-worn electronic devices such as personal heads-up display device or a haptic device that vibrates choices. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A system for secure pass-set entry comprising:

an authenticator device comprising:

a processor;

a display; and a memory storing an authentication application, the authentication application configured to generate a pass-set menu comprising a matrix of images to output in visual format on the display, wherein each image in the matrix of images is designated with a unique numeric identifier, the authentication application further configured to output audio comprising the unique numeric identifier for each image; and a headset device configured to receive the audio comprising the unique numeric identifier for each image from the authenticator device, the headset device comprising:

an output interface to output the audio comprising the unique numeric identifier for each image to the pass-set menu to a user;

a user input interface configured to receive user actions to navigate the pass-set menu and receive user menu selections; and a data interface for receiving the audio comprising the unique numeric identifier for each image from the authenticator device and transmitting user menu selections to the authenticator device.

2. The system of claim 1, wherein a start point of the audio corresponding to the pass-set menu is randomized.

3. The system of claim 1, wherein the authentication application is configured to receive user menu selections from the headset device and assemble the user menu selections into a user-entered pass-set.

4. The system of claim 1, wherein the output interface comprises a headphone.

5. The system of claim 1, wherein the user input interface comprises an interface configured to navigate a list of menu items in a forward direction only.

6. A method for secure pass-set entry comprising:

generating a pass-set menu comprising a matrix of images, wherein each image in the matrix of images is designated with a unique numeric identifier;

outputting the pass-set menu comprising the matrix of images in a visual format on an authenticator device display of an authenticator device;

outputting an audio comprising the unique numeric identifier for an image associated with the pass-set menu at a headset device;

receiving user actions at the headset device to navigate the pass-set menu and receive user menu selections comprising unique numeric identifiers, the user actions responsive to the pass-set menu in the visual format in conjunction with the audio output at the headset device and transmitting from the headset device to the authenticator device the user actions.

7. The method of claim 6, further comprising assembling the user actions into a user-entered pass-set, the user-entered pass-set comprising two or more images in the matrix of images.

8. The method of claim 6, wherein the audio further comprises numerical choices and the audio is stored at the headset.

9. The method of claim 6, wherein the audio associated with the pass-set menu is transmitted from the authenticator device to the headset.

10. The method of claim 6, wherein the audio associated with the pass-set menu is transmitted from the authenticator device to the headset responsive to the user actions at the headset device.

11. A method for secure pass-set entry comprising:

generating a pass-set menu having a fixed order of menu items;

randomizing a start point within the pass-set menu at which the menu items are audibly output to a user;

outputting an audio associated with the pass-set menu corresponding to a next menu item or a previous menu item at a headset device;

receiving user actions corresponding to a next item command, a previous item command, or an item selection command, the user actions responsive to the audio output at the headset device;

tracking user actions corresponding to the next item command and the previous item command comprising counting a number of next item commands and counting a number of previous item commands; and determining a selected item using the start point and the tracked user actions corresponding to the next item command and the previous item command.

12. The method of claim 11, further comprising assembling the user actions into a user-entered pass-set.

13. The method of claim 11, wherein receiving user actions comprises receiving user actions at a scroll wheel user interface.

14. The method of claim 11, wherein the next item command is a button press up and the previous item command is a button press down, wherein the number of button press ups is tracked and the number of button press downs is tracked.

15. A method for secure pass-set entry comprising:

generating a pass-set menu at a headset device;

transmitting the pass-set menu to an authenticator device;

outputting the pass-set menu in a visual format on an authenticator device display;

outputting an audio associated with the pass-set menu at the headset device;

receiving user actions at the headset device to navigate the pass-set menu and receive a user menu selection from the pass-set menu, the user actions responsive to outputting the pass-set menu in the visual format on the authenticator device display and outputting the audio associated with the pass-set menu at the headset device; and transmitting from the headset device to the authenticator device the user actions;

wherein the pass-set menu is a plurality of images, wherein each image is designated with an identifier;

wherein the identifier is a numeric identifier and the audio associated with the pass-set menu output at the headset device is an audible reading of the numeric identifier.

* * * * *